(12) United States Patent
Kim (10) Patent No.: US 6,313,966 B1
(45) Date of Patent: Nov. 6, 2001

(54) CASSETTE TAPE ROTATION CONTROL MECHANISM

(75) Inventor: Yu-In Kim, Incheon (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/228,415

(22) Filed: Jan. 12, 1999

(51) Int. Cl.$^7$ .................................................. G11B 5/008
(52) U.S. Cl. ...................................... 360/96.3; 360/251.1
(58) Field of Search ............................ 360/251.1, 251.4, 360/96.1, 96.4

(56) References Cited

U.S. PATENT DOCUMENTS

5,363,259  11/1994  Narita .
5,402,289   3/1995  Hayashi et al. .
5,452,160   9/1995  Sakuma et al. .

*Primary Examiner*—A. J. Heinz (57) ABSTRACT

A cassette tape deck having a detection gear switching device of a simple structure which alternately switch the detection gear for detecting rotations of reel gears. The deck has: a chassis, a couple of reel gears installed at the chassis, a lever provided at the chassis and moving in a vertical direction, a head plate provided at the chassis and moving in a horizontal direction by the lever, a couple of transmission gear for transmitting a torque of a main motor to the reel gears, the transmission gear being engaged with any one of the reel gears by the head plate, a first plate turned by the lever, a second plate moving in a vertical direction by the first plate, a hinge plate turned by the second plate, and a detection gear rotatably installed at the hinge

12 Claims, 13 Drawing Sheets

CASSETTE TAPE ROTATION CONTROL MECHANISM

BACKGROUND OF THE INVENTION

1. Field of the Invention

The present invention relates to a cassette tape deck having a detection gear switching device of a simple structure which allows a detection gear for detecting rotations of reels to be alternately engaged with a selected reel.

2. Description of the Prior Art

Generally, a tape player has a cassette tape deck on which a tape running system including a pinch roller and guide rollers and a cassette loading mechanism including a motor and gears are installed.

A cassette having a magnetic tape therein is guided to a predetermined position of the cassette tape deck by the cassette loading mechanism and is mounted on a take-up reel and a supply-reel.

After the cassette has been mounted on the take-up reel and the supply-reel, selected running operations such as playing, recording, fast forwarding and rewinding are carried out according to the user's choice. At this time, the magnetic tape forwardly or reversely moves along the tape running system according to the driving direction of a capstan motor.

Figure 1:
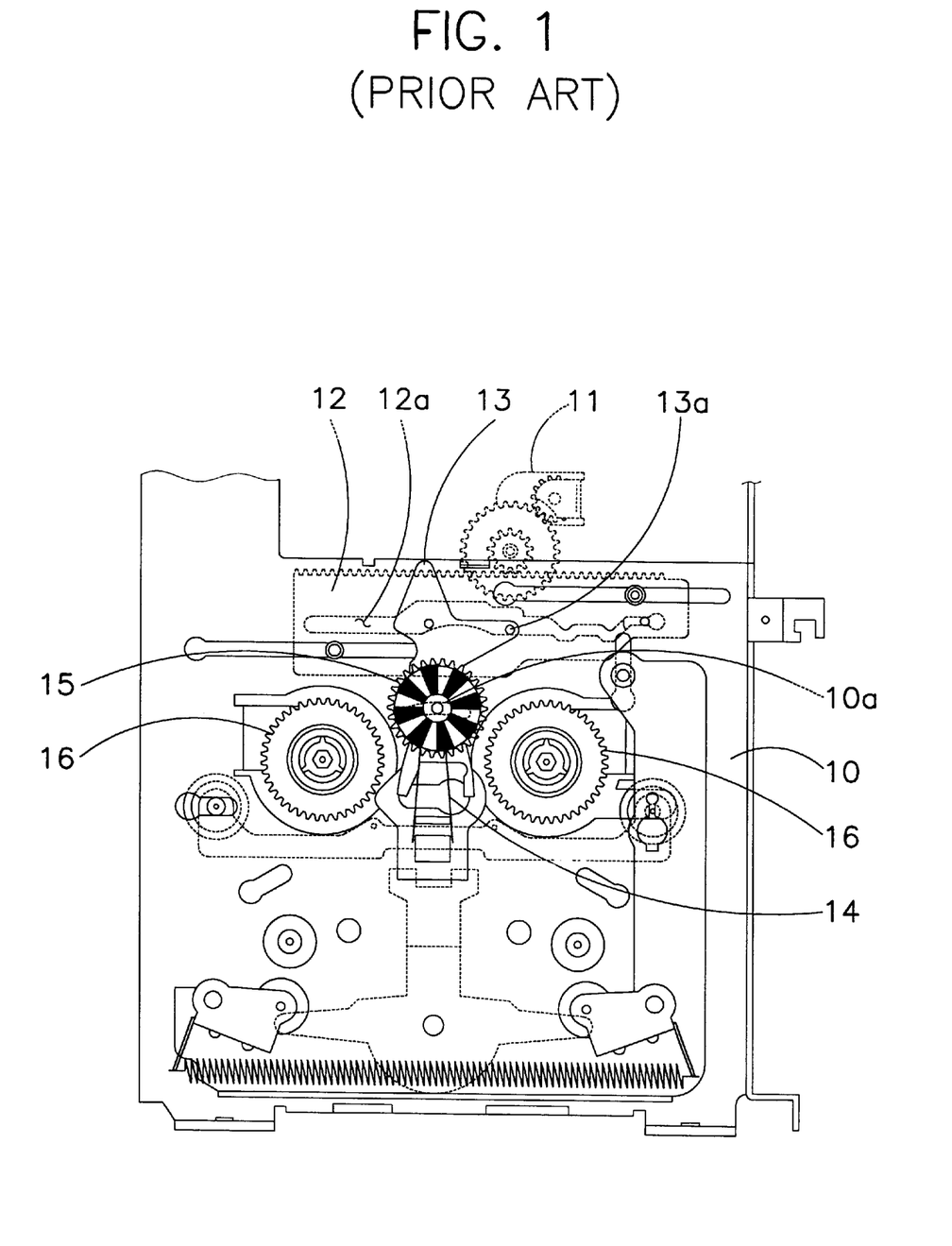
FIG. 1 is a plan view of a conventional cassette tape deck.

One example of the tape running system is disclosed in U.S. Pat. No. 5,402,289 issued to Hideki Hayashi et al. FIG. 1 shows a cassette tape deck as disclosed in U.S. Pat. No. 5,402,289.

Referring to FIG. 1, when a driving motor 11 installed at a plate 10 is actuated, a mode plate 12 having a cam 12a linearly moves so as to turn a play link 13 having a cam follower 13a inserted along cam 12a. While being turned, play link 13 pushes one of legs of a spring 14 having an inverse U shape. Accordingly, a detection gear 15 moves along a guide groove 10a formed at plate 10 and engages with any one of reels 16, thereby detecting a rotation of engaged reel 16 which rotates clockwise or counterclockwise.

However, the deck of Hideki includes mode plate 12 having cam 12a of a complex shape. So, the machining of mode plate 12 is not easy.

In addition, there may be an interference between a plurality of bending portions of cam 12a and cam follower 13a, resulting in damage thereof.

SUMMARY OF THE INVENTION

The present invention is intended to overcome the above described disadvantages. Therefore, it is an object of the present invention to provide a cassette tape deck having a simply structured detection gear switching device.

In order to achieve the above object of the present invention, there is provided a cassette tape deck, comprising: a chassis at which a main motor and a sub motor are installed; a couple of reels installed at the chassis, the reels rotating in an identical direction by the main motor which is alternately actuated in a clockwise or in a counterclockwise direction; a lever provided in a lower surface of the chassis, the lever moving in a first linear direction by the sub motor which is alternately actuated in the clockwise or in the counterclockwise direction; a head plate provided at a top surface of the chassis, the head plate moving in a second linear direction perpendicular to the first linear direction by the lever; a couple of transmission gears installed in the lower surface for transmitting a torque of the main motor to the reels, the transmission gears being engaged with any one of the reel gears by the head plate; a first plate turnably installed in the lower surface of the chassis, the first plate being rotated by the lever; a second plate provided between the chassis and the head plate, the second plate moving in the first linear direction by the first plate; a hinge plate turnably installed at the lower surface of the chassis, the hinge plate turning by the second plate; and a detection gear rotatably installed at the hinge plate for detecting rotations of the reels, the detection gear being alternately engaged with one of the reels by the hinge plate.

The chassis is formed with first and second linear guide grooves for guiding the lever, and the lever includes first and second pins inserted into the first and second linear guide grooves respectively for guiding the lever and preventing the lever from being separated from the chassis.

The first and second pins include first and second bodies penetrating the first and second linear guide grooves respectively and first and second contact pieces extending from the first and second bodies respectively so as to make contact with the top surface of the chassis, upper ends of the first and second linear guide grooves having larger width than diameters of the first and second contact pins respectively such that the first and second pins are separable from the first and second vertical guide grooves.

The head plate is formed at a side portion thereof with a second cam making contact with the second pin, thereby moving the head plate in the horizontal direction.

The lever includes a rack receiving a torque from the sub motor so as to move the lever in the first linear direction.

The lever is formed with a contact pin, and the first plate is formed at a side portion thereof with a first cam making contact with the contact pin so as to turn the first plate.

The first plate is disposed at a portion thereof along a connect pin extending from the chassis so as to turn, and the connect pin is provided at a junction portion to first plate thereof with a connect plate including a center portion of an arcuate shape assembled to the connect pin such that the center portion is spaced apart from the first plate and both end portions making contact with the first plate, the center portion resiliently pulling the connect pin toward the first plate, the end portions pushing the first plate toward the chassis.

The second plate is formed with a projection, and the chassis is formed with a third linear guide groove receiving the projection for guiding the second plate.

The first plate is formed with a groove, and the second plate is formed with a projection penetrating the chassis so as to be inserted into the groove, thereby moving together with the first plate.

The hinge plate moves together with the second plate by a spring.

The spring has a "⊂" shape, an opening portion of which is connected to the second plate and a closed portion of which is connected to the hinge plate, and the spring moving in the vertical direction and simultaneously turning.

The opening portion of the spring is twisted such that a force exerting direction from the second plate to the spring and a force exerting direction from the spring to the second plate are opposite.

The hinge plate is formed with a recess for holding the closed portion of the spring, and the second plate is formed with a latch piece positioned within the opening portion of the spring.

The recess is substantially identical to the closed portion of the spring in shape and is provided with a cover for preventing the spring from separating therefrom.

The cassette tape deck according to the present invention does not require the lever for switching the detection gear to be formed with a complex shape cam, so the structure thereof is very simple.

BRIEF DESCRIPTION OF THE DRAWINGS

The above object, characteristics and other advantages of the present invention will become more apparent by describing in detail a preferred embodiment thereof with reference to the attached drawings in which.

DESCRIPTION OF THE PREFERRED EMBODIMENT

Hereinafter, a preferred embodiment of the present invention will be explained in detail with reference to the accompanying drawings.

Figure 2:
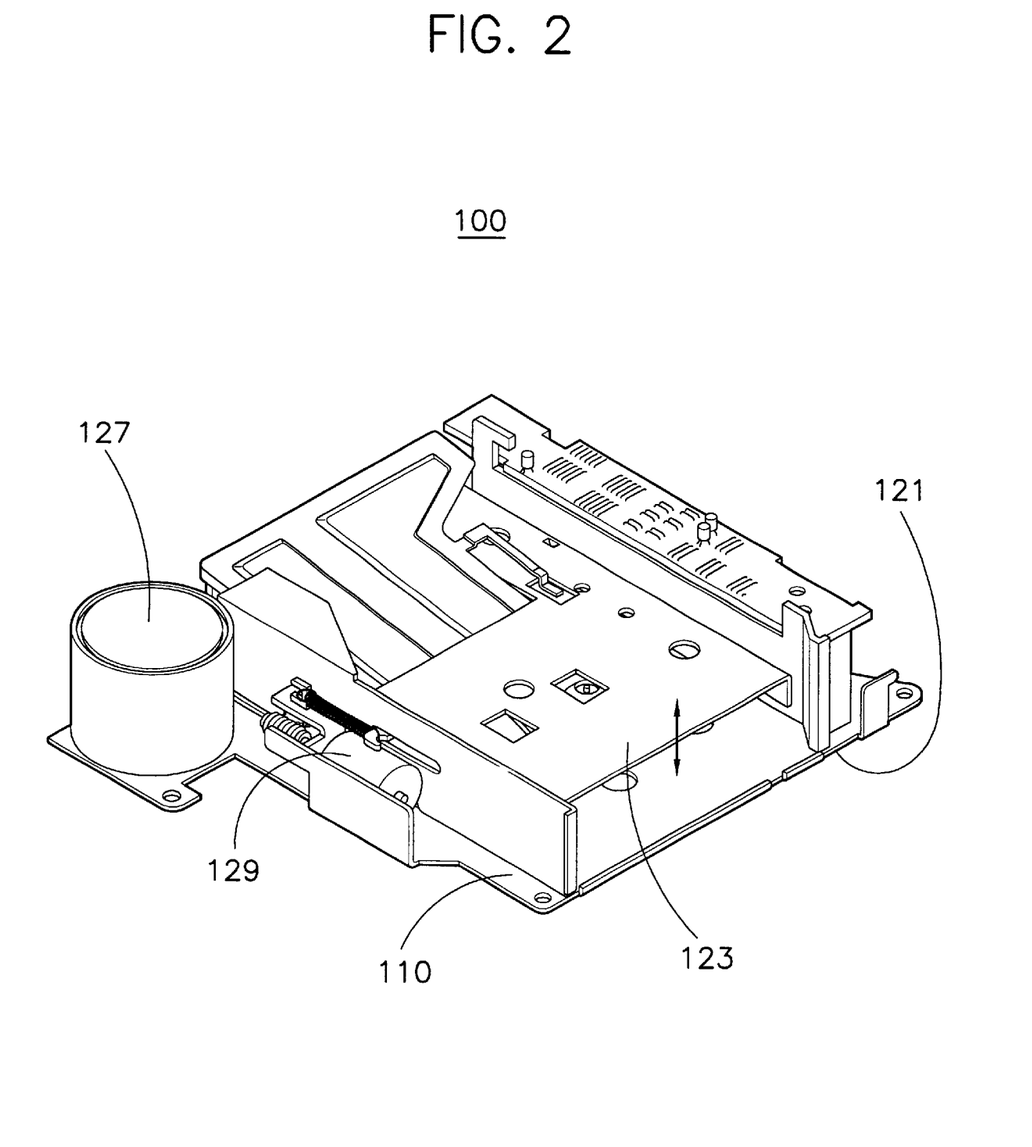
FIG. 2 is a perspective view of a cassette tape deck in accordance with an embodiment of the present invention.

FIG. 2 is a perspective view of a cassette tape deck in accordance with an embodiment of the present invention;

Referring to FIG. 2, a deck 100 includes a chassis 110, a bottom plate 121 assembled at a lower surface of chassis 110, and a holder 123 assembled at an upper portion of chassis 110. When a user controls various switches (not shown) provided at an outer casing(not shown) of an audio component, a microcomputer (not shown) properly controls a main motor 127 and a sub motor 129 so as to run a tape.

Figure 3:
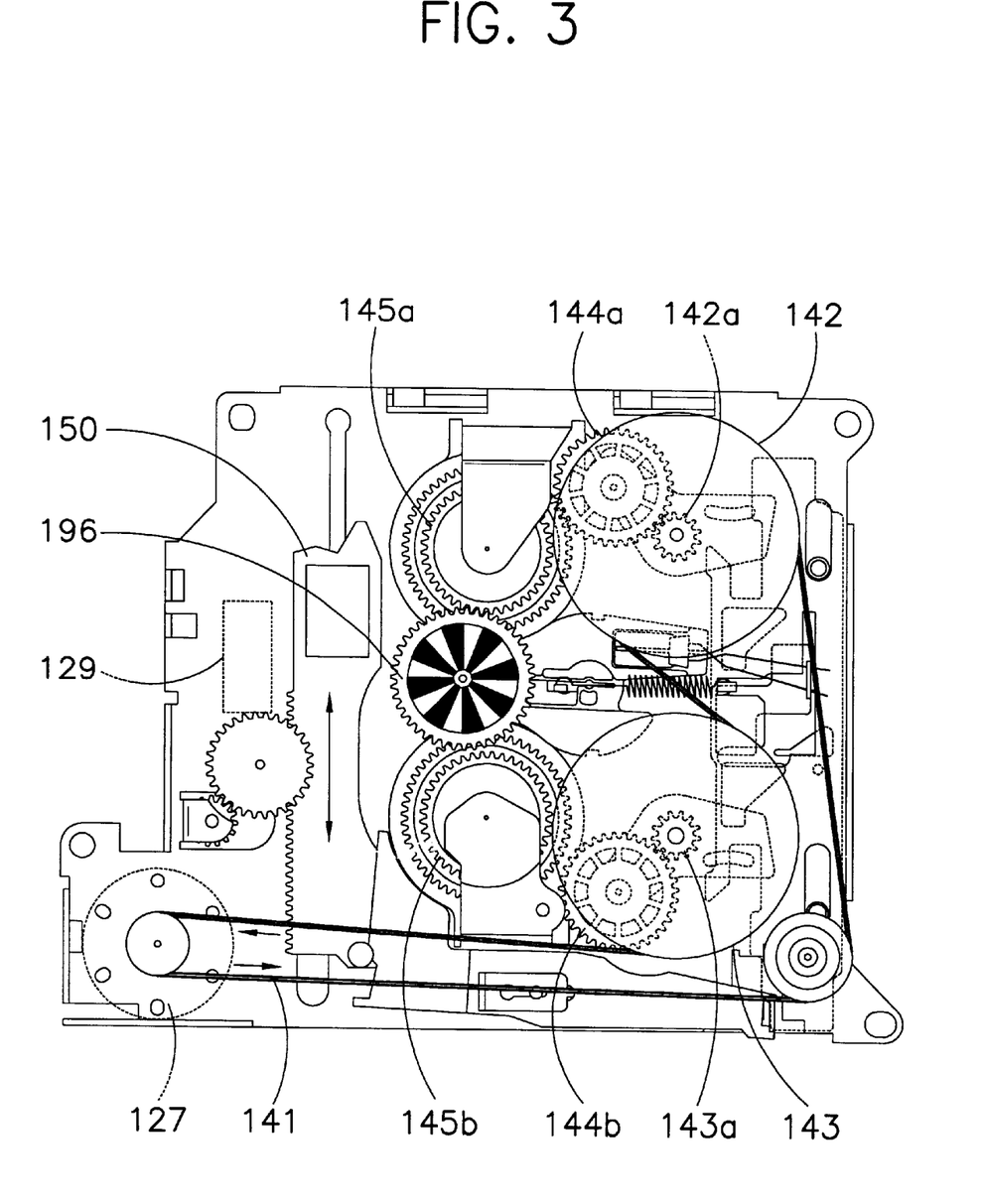
FIG. 3 is a bottom view of the cassette tape deck where a bottom plate is removed.

Firstly, a torque transmitting process between main motor 127 alternately actuated in clockwise and counterclockwise directions and reel gears 145a and 145b is explained with reference to FIG. 3 which is a bottom view of the cassette tape deck where the bottom plate 121 is removed.

When main motor 127 is actuated by a microcomputer (not shown), first and second flywheels 142 and 143 having first and second idle gears 142a and 143a respectively rotate in opposite directions by a belt 141. Then, first and second transmission gears 144a and 144b respectively engaged with first and second idle gears 142a and 143a rotate. First and second transmission gears 144a and 144b are alternately engaged with first and second reels 145a and 145b so as to transmit a torque of main motor 127 to first and second reels 145a and 145b. First and second flywheels 142 and 143 are operated in the opposite directions to each other, so first and second reels 145a and 145b are also rotated in the opposite directions to each other, thereby running the tape in the forward or backward direction.

Figure 4:
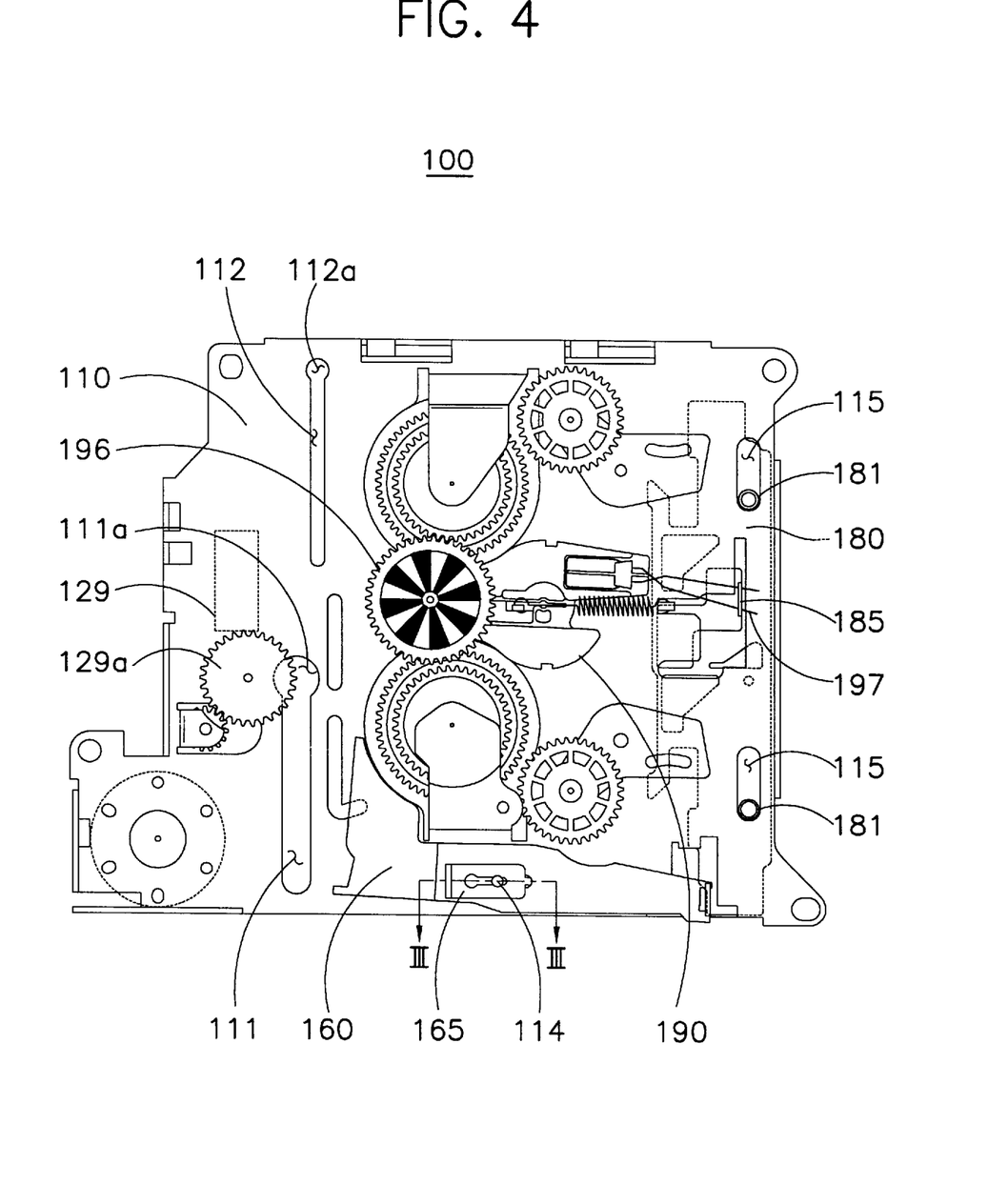
FIG. 4 is a bottom view of the cassette tape deck where some of the structures are removed.
Figure 5:
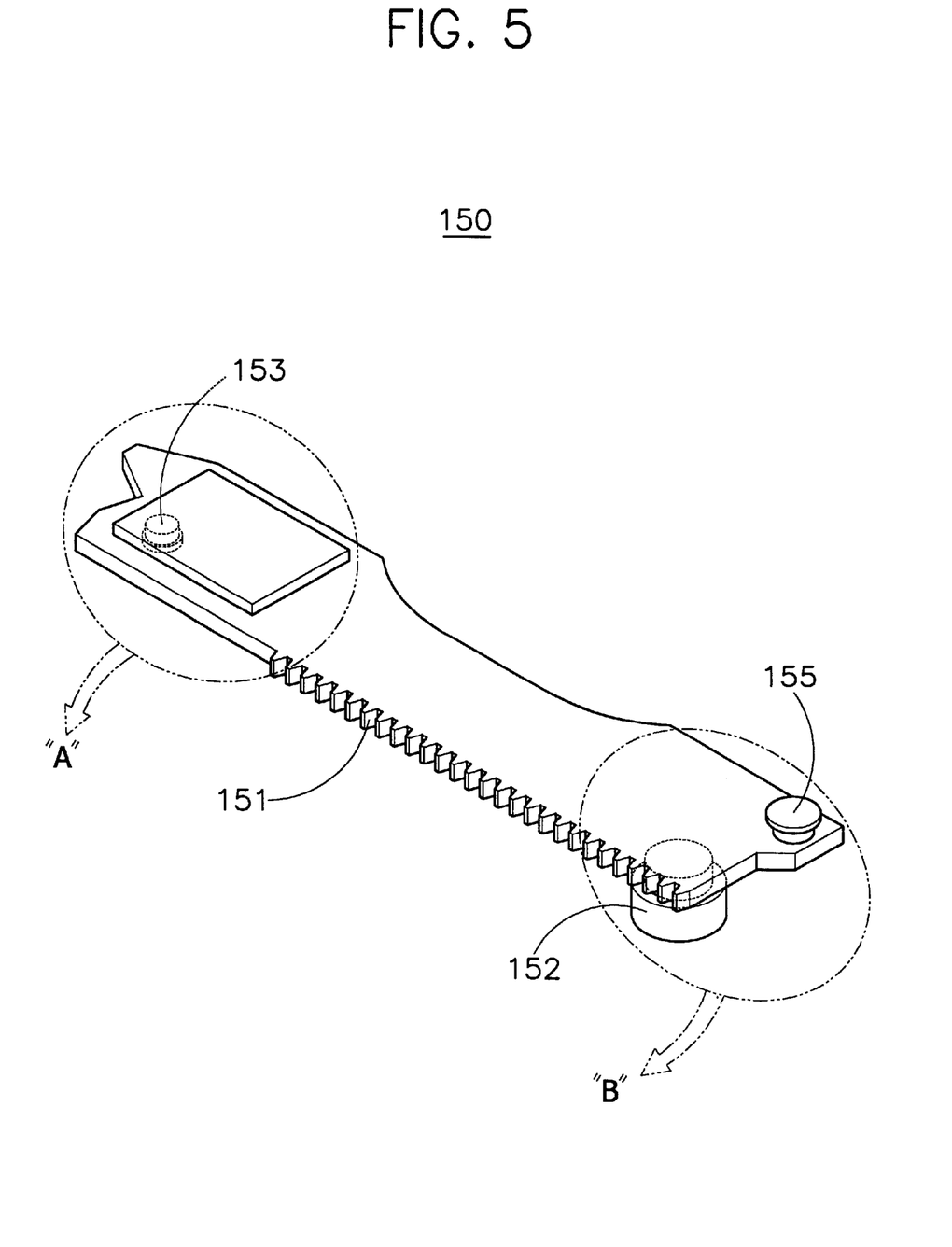
FIG. 5 is a lower perspective view of a lever in accordance with a preferred embodiment of the present invention.
Figure 6A:
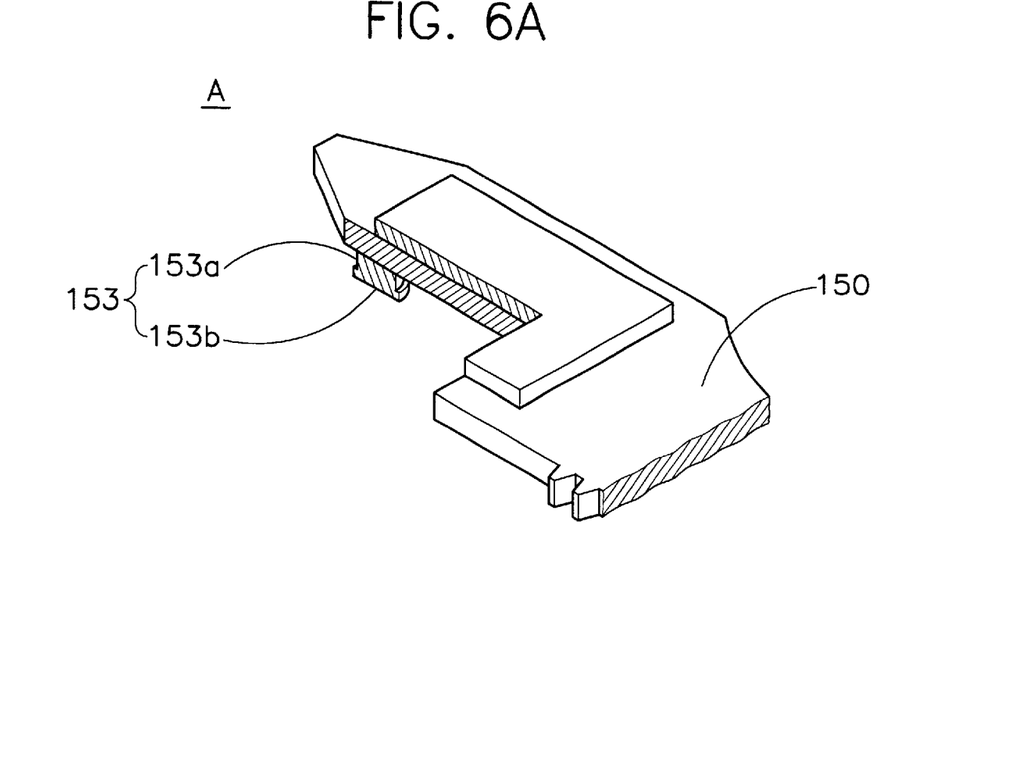
FIG. 6A is an enlarged view of portion A in FIG. 5.
Figure 6B:
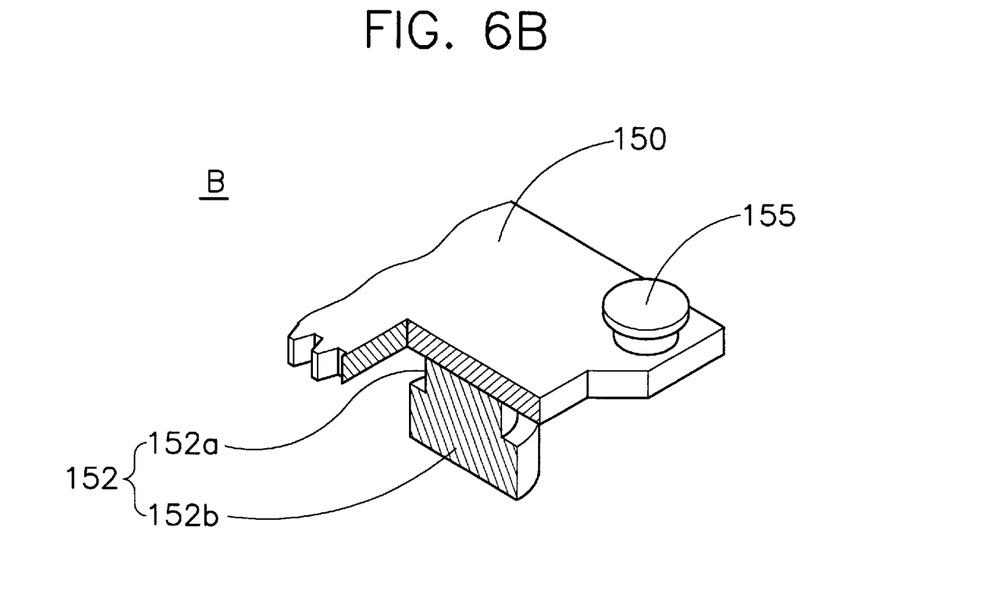
FIG. 6B is an enlarged view of portion B in FIG. 5.

At the same time main motor 127 is actuated, sub motor 129 is alternately actuated in the clockwise and counter clockwise directions so as to move a lever 150. Referring to FIGS. 4 to 6, lever 150 is installed at the lower surface of chassis 110 such that it moves in the first linear direction. Lever 150 includes a rack 151 engaged with a gear 129a which is rotated by sub motor 129, thereby moving lever 150 in the first direction.

Lever 150 includes first and second pins 152 and 153. First and second pins 152 and 153 include first and second bodies 152a and 153a and first and second contact pieces 152b and 153b extending from first and second bodies 152a and 153a respectively so as to make contact with a top surface of chassis 110. Diameters of first and second contact pieces 152b and 153b are larger than those of first and second bodies 152a and 153a for preventing lever 150 from separating from chassis 110. It will be described in detail later.

Chassis 110 is formed with first and second linear guide grooves 111 and 112 for allowing first and second bodies 152a and 153a to move therealong. First and second vertical guide grooves 111 and 112 are substantially identical in length and have larger widths than the diameters of first and second bodies 152a and 153a. Also, the diameters of first and second contact pieces 152b and 153b are larger than the widths of first and second vertical guide grooves 111 and 112, thereby preventing lever 150 from being separated from chassis 110. In addition, lever 150 can move in the first linear direction by first pin 152 and first linear guide groove 111 as well as by second pin 153 and second linear guide groove 112.

Upper ends 111a and 112a of first and second linear guide grooves 111 and 112 have larger widths than the diameters of first and second contact pieces 152b and 153b, which enables first and second contact pieces 152b and 153b to be inserted into and separated from first and second vertical guide grooves 111 and 112.

Figure 7:
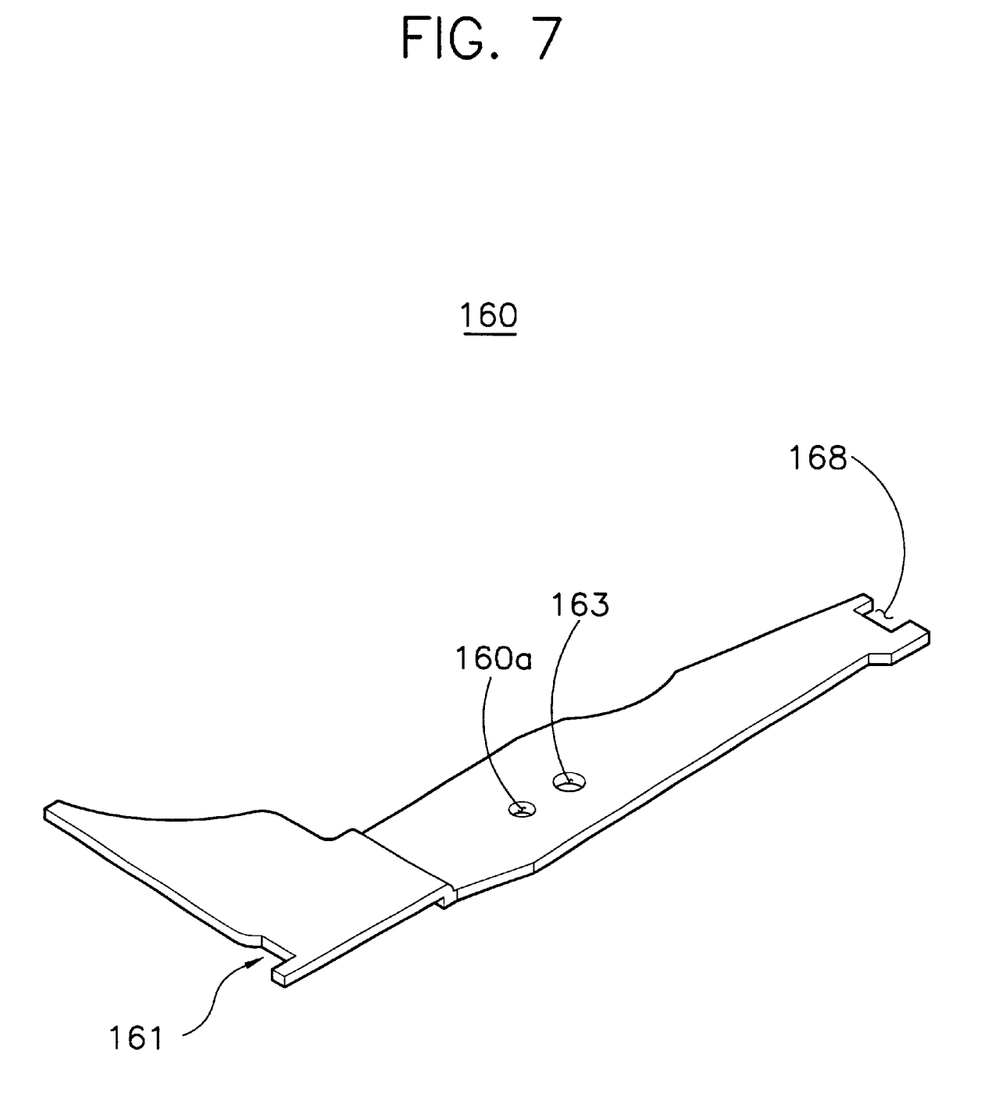
FIG. 7 is a lower perspective view of a first plate in accordance with a preferred embodiment of the present invention.
Figure 8A:
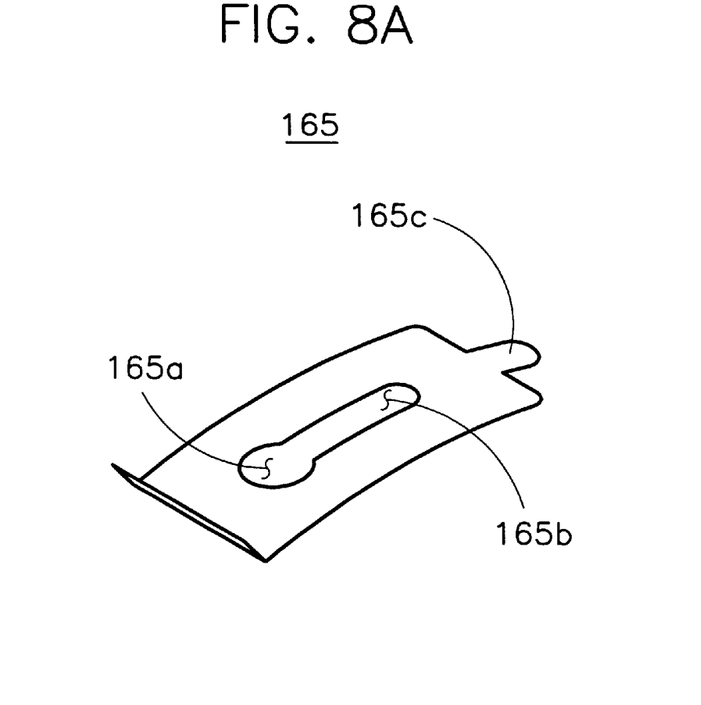
FIG. 8A is a perspective view of a connect plate in accordance with a preferred embodiment of the present invention.
Figure 8B:
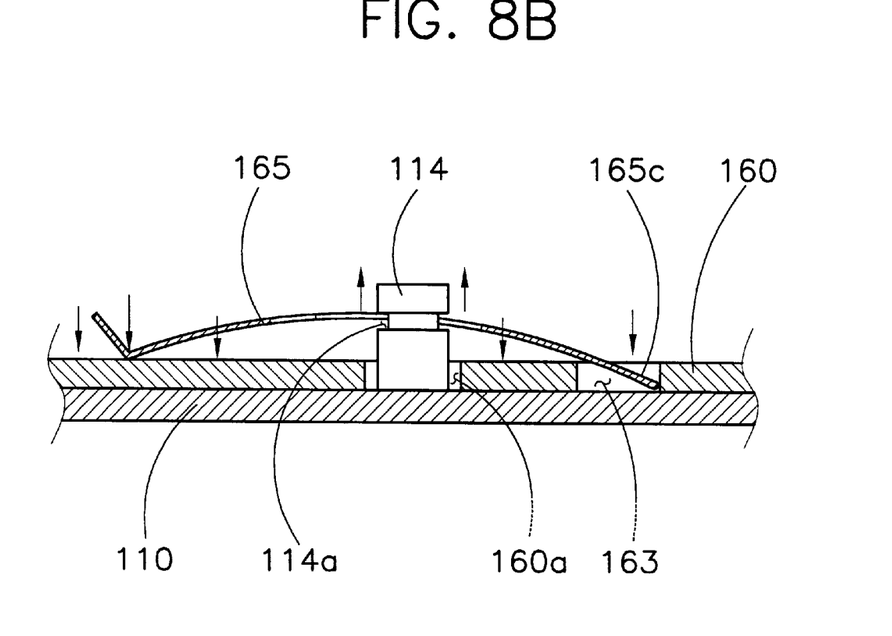
FIG. 8B is a crosssectional view taken along line III—III shown in FIG. 4 for showing that the first plate is assembled to the connect plate.

Lever 150 moves in the first linear direction by sub motor 129 so as to move a first plate 160. FIG. 7 is a lower perspective view of a first plate in accordance with a preferred embodiment of the present invention, FIG. 8a is a perspective view of a connect plate 165 in accordance with a preferred embodiment of the present invention, and FIG. 8b is a crosssectional view taken along line III—III shown in FIG. 4 for showing that the first plate 160 is assembled to the connect plate 165.

Referring to FIGS. 4, 5, 7, 8a and 8b, first plate 160 is turnably installed at the lower surface of chassis 110. In detail, first plate 160 is formed with a hole 160a through which a connect pin 114 integrally formed at chassis 110 passes so as to turn first plate 160 about connect pin 114. Lever 150 is formed at a lower end thereof with a contact pin 155, and first plate 160 is formed at a left side portion thereof with a first cam 161 making contact with contact pin 155. Contact pin 155 of lever 150 moves in the first linear direction and first cam 161 allows first plate 160 to turn about connect pin 114.

The connect plate 165 has an arcuate shape provided at a junction portion of connect pin 114 and first plate 160. A center portion of connect plate 165 is spaced apart from first plate 160, and both end portions of connect plate 165 are assembled to first plate 160. Connect pin 114 is resiliently pulled by connect plate 165 toward first plate 160, and the end portions of connect plate 165 push first plate 160 toward chassis 110. Accordingly, both a portion of chassis 110 and first plate 160 adjacent to connect pin 114 and a portion of chassis 110 and first plate 160 spaced apart from connect pin 114 by a predetermined distance strongly make contact with each other.

Connect pin 114 is formed at a circumferential surface thereof with a latch groove 114a of a rim shape, and connect plate 165 is formed with a latch portion 165b communicated with an inlet portion 165a and inserted into latch groove 114a of connect pin 114. Also, connect plate 165 is formed at an end portion thereof with a connect projection 165c connected to a connect hole 163 formed at first plate 160. Latch groove 114a and latch portion 165b prevent connect plate 165 from separating from connect pin 114, and connect hole 163 and connect projection 165c present connect plate 165 from turning.

Figure 9:
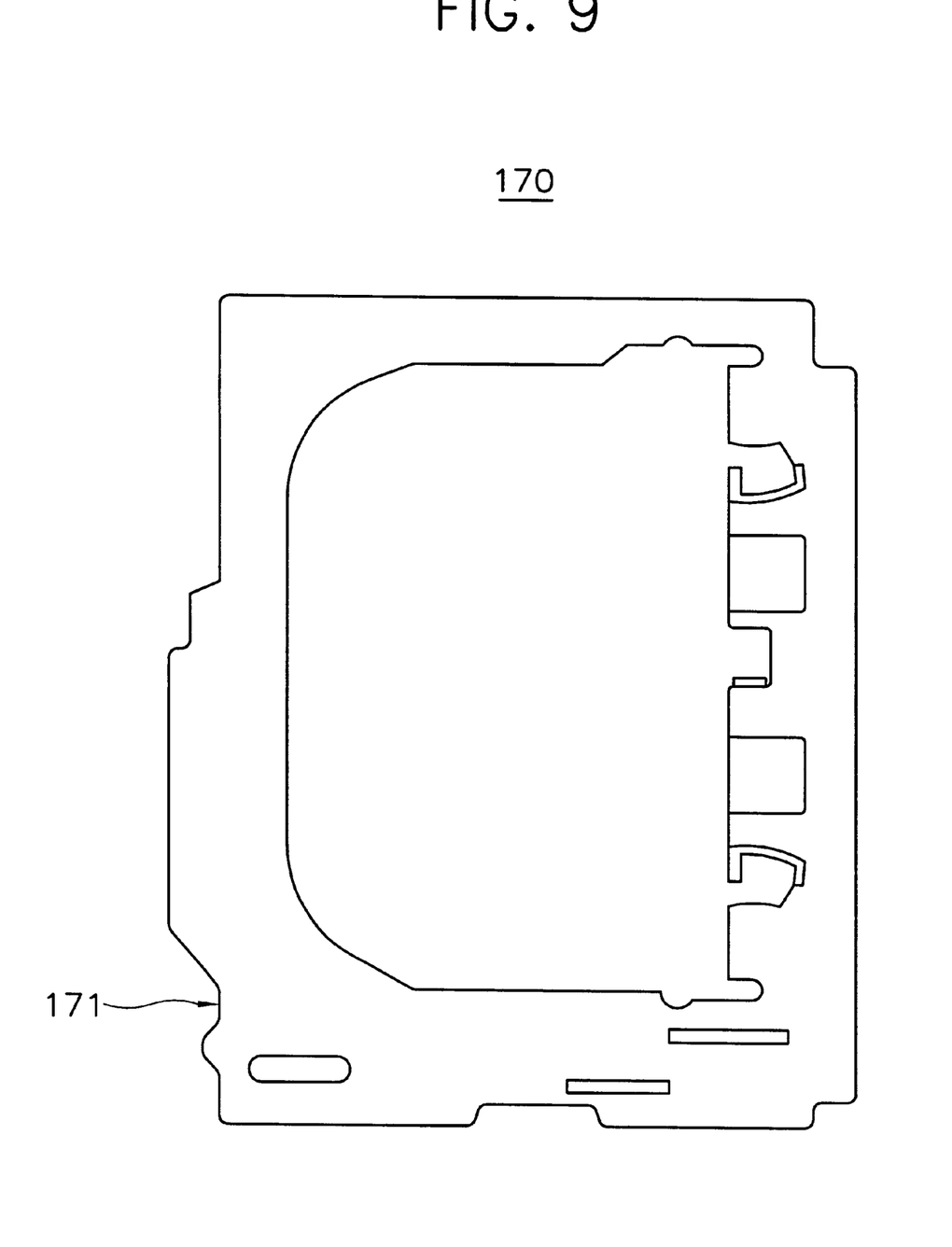
FIG. 9 is a bottom view of a head plate in accordance with a preferred embodiment of the present invention.

FIG. 9 is a bottom view of a head plate 170 in accordance with a preferred embodiment of the present invention.

Referring to FIG. 9, the head plate 170 is installed at the top surface of chassis 110. Head plate 170 is formed at a side portion thereof with a second cam 171 making contact with first pin 152 of lever 150. First pin 152 and second cam 171 allow head plate 170 to move in a second linear direction perpendicular to the first linear direction. And head plate 170 moves transmission gears 144a and 144b in the second linear direction so as to engage one of them with one of reels 145a and 145b.

Figure 10:
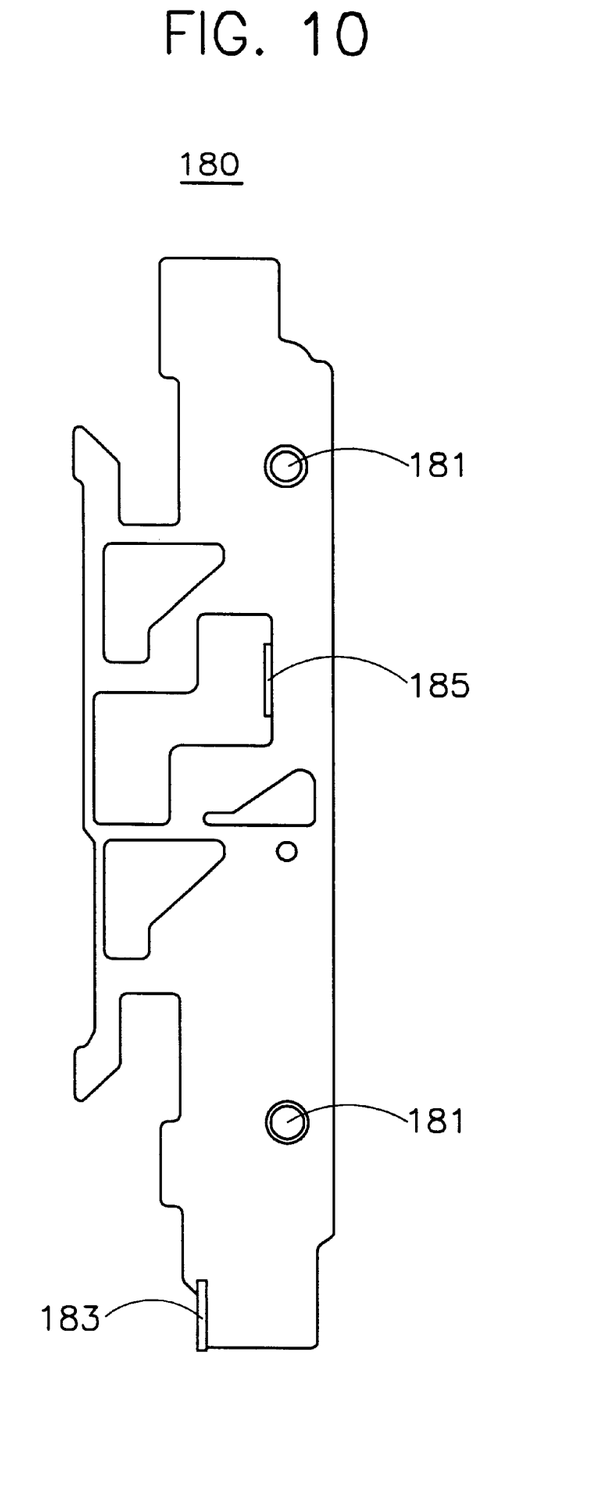
FIG. 10 is a bottom view of a second plate in accordance with a preferred embodiment of the present invention.

With reference to FIGS. 4, 7 and 10, a second plate 180 which moves by first plate 160 will be explained. FIG. 10 is a bottom view of second plate 180 in accordance with a preferred embodiment of the present invention.

Second plate 180 is installed between chassis 110 and head plate 170 in such a manner that it moves in the first linear direction. Second plate 180 is formed with cylindrical projections 181 for guiding a movement thereof in the first linear direction, and chassis 110 is formed with a third linear guide grooves 115 into which projections 181 are inserted.

First plate 160 is formed at a right side thereof with a groove 168, and second plate 180 is formed with a projection 183 penetrating chassis 110 so as to be inserted into groove 168. Groove 168 and projection 183 transmit an urging force of first plate 160 to second plate 180.

Figure 11:
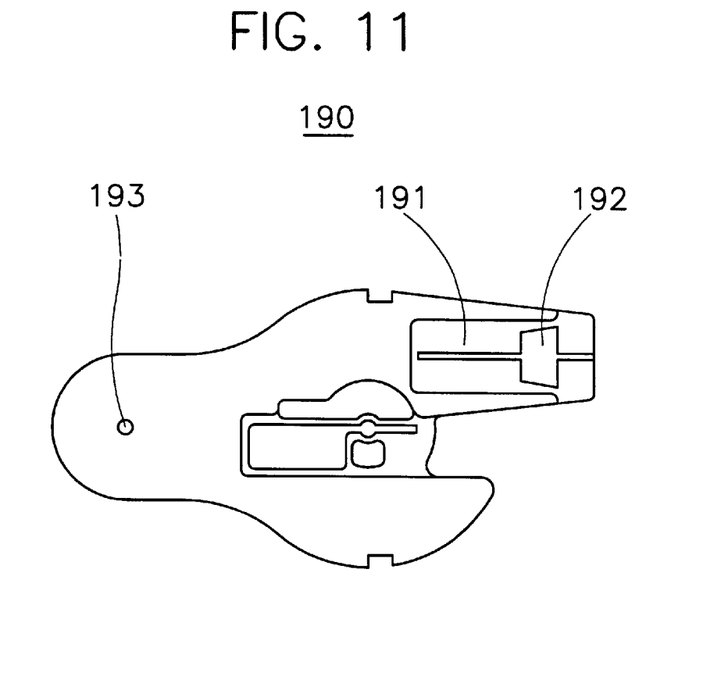
FIG. 11 is a bottom view of a hinge plate in accordance with a preferred embodiment of the present invention.
Figure 12:
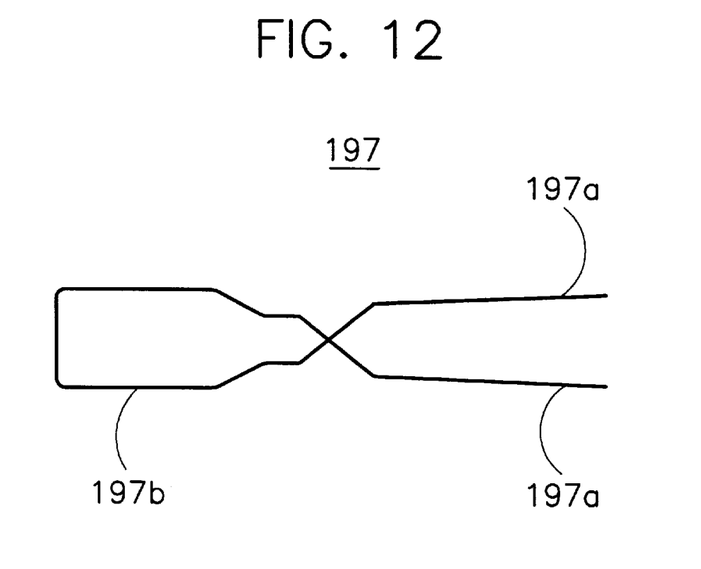
FIG. 12 is a bottom view of a spring in accordance with a preferred embodiment of the present invention.

At the lower surface of chassis 110, a detect device moved by second plate 180 for detecting rotations of reels 145a and 145b is provided. FIG. 11 is a bottom view of a hinge plate 190 in accordance with a preferred embodiment of the present invention, and FIG. 12 is a bottom view of a spring in accordance with a preferred embodiment of the present invention.

Referring to FIGS. 4, 10, 11 and 12, the hinge plate 190 is hinged to an underside of chassis 110 such that hinge plate 190 can receive an urging force of second plate 180 through a spring 197.

As shown in FIG. 10, second plate 180 is formed with a latch piece 185 penetrating chassis 110.

As detailedly shown in FIG. 11, hinge plate 190 is provided with a recess 191 and a cover 192.

In addition, as shown in FIG. 12, spring 197. has a head portion 197b and a pair of legs 197a which extend from head portion 197 and are crossed to each other for stably transferring the urging force of second plate 180 to hinge plate 190.

Legs 197a of spring 197 are inserted into latch piece 185 of second plate 180 and head portion 197b of spring 197 is rested in recess 191 of hinge plate 190 so that legs 197a of spring 197 move in the first linear direction together with second plate 180 and head portion 197b hingedly moves together with hinge plate 190.

Since legs 197a of spring 197 are crossed to each other, when second plate 180 moves in the first linear direction, a force exerted on spring 197 from second plate 180 is opposite to a force exerted on second plate 180 from spring 197.

In addition, recess 191 is substantially identical to head portion 197b of spring 197 in shape and cover 192 of hinge plate 190 prevents spring 197 from separating from recess 191.

A detection gear 196 is rotatably inserted in a thruhole 193 of hinge plate 190. Detection gear 196 is alternately engaged with one of reels 145a and 145b according to the operation of hinge plate 190 so as to detect rotations of the reels 145a and 145b.

Figure 13A:
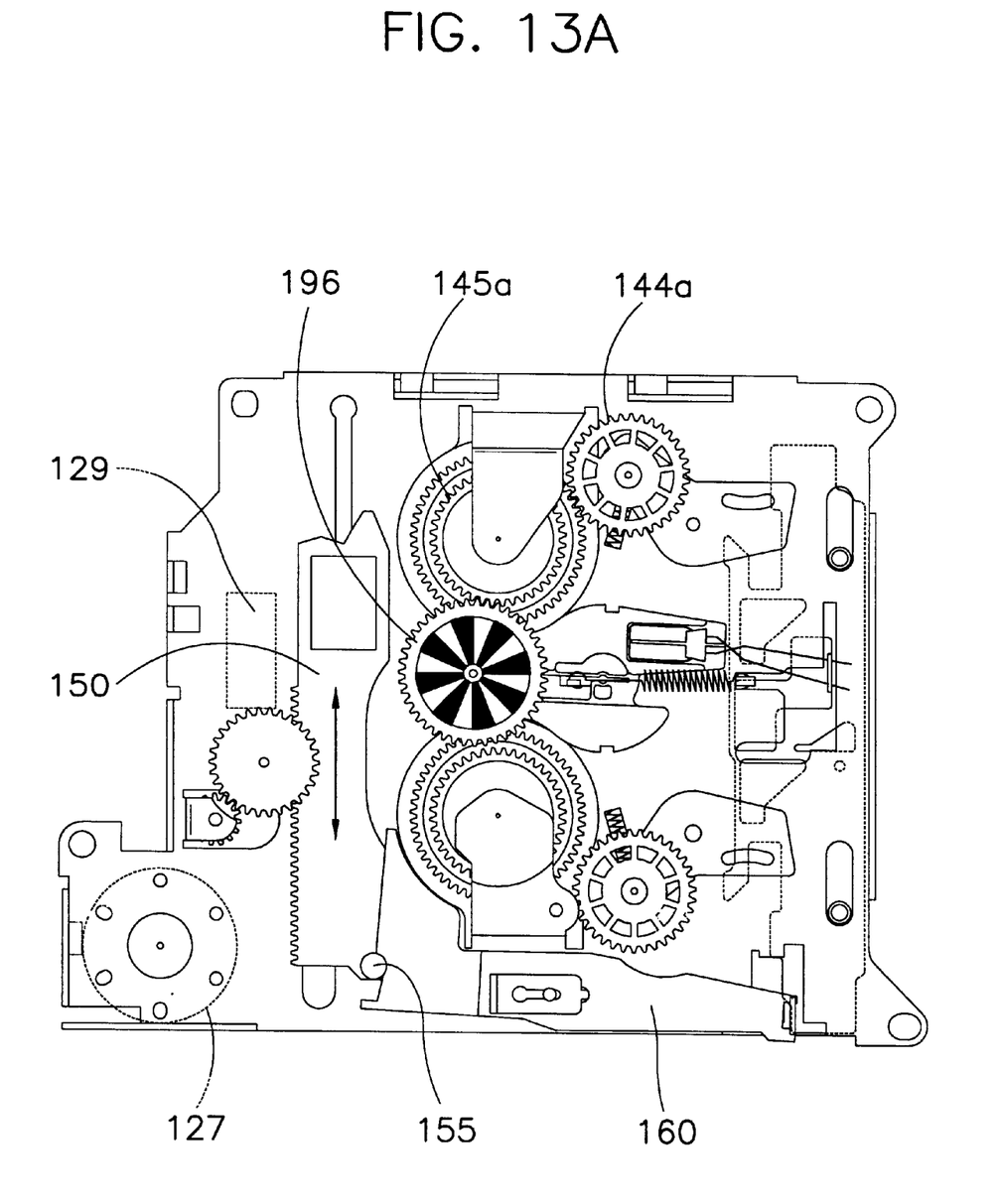
FIGS. 13A and 13B are operational views of the cassette tape deck in accordance with a preferred embodiment of the present invention.
Figure 13B:
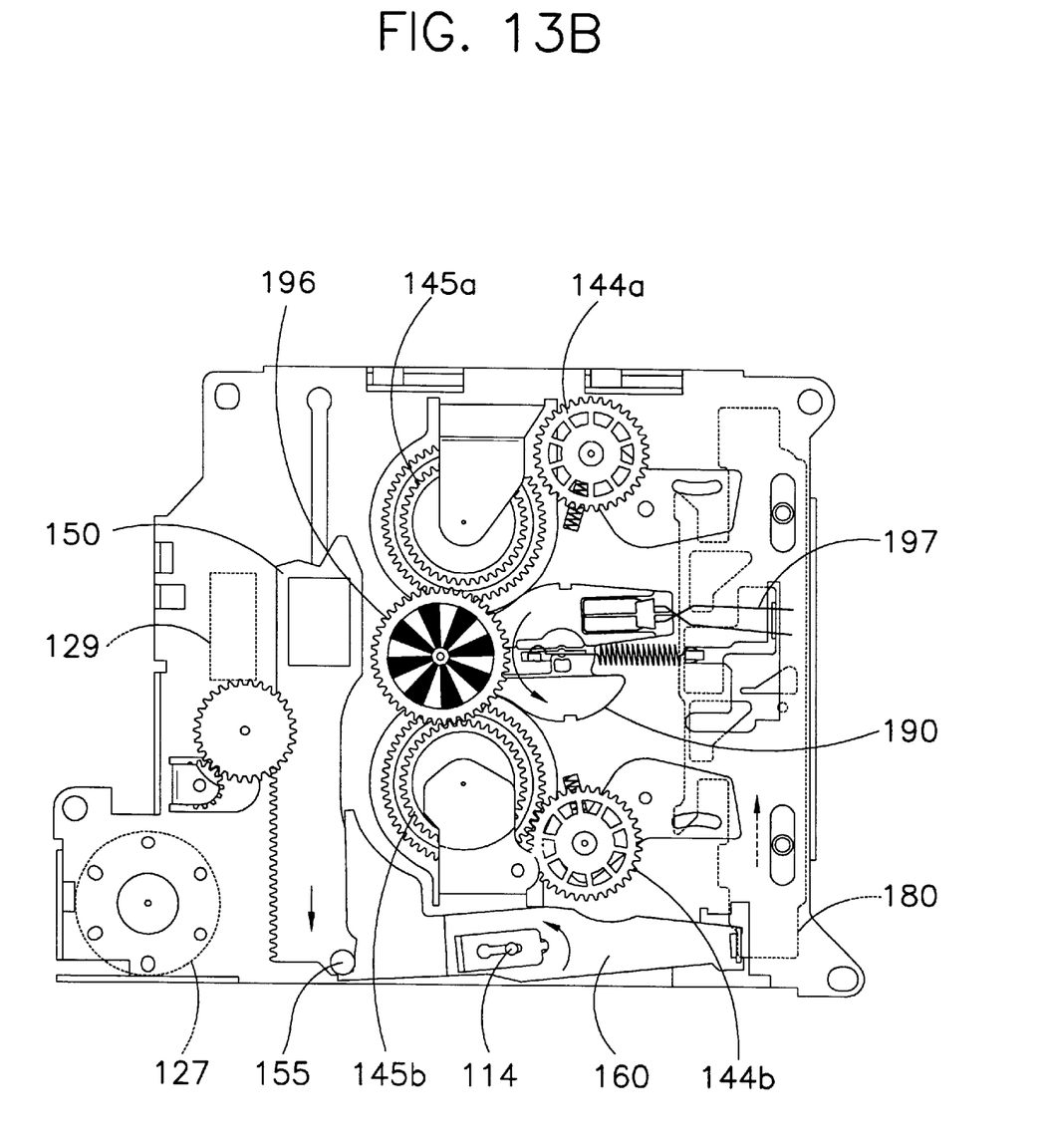

FIGS. 13A and 13B are operational views of the cassette tape deck in accordance with a preferred embodiment of the present invention. Referring to FIGS. 13A and 13B, when contact pin 155 of lever 150 makes contact with the upper end of first cam 161 of first plate 160, the operating mode of the cassette tape deck is "play". At this time, by microcomputer's control, the torque of main motor 127 is transmitted to first reel 145a through first transmission gear 144a and detection gear 196 engages with first reel 145a so as to detect the rotation of first reel 145a.

Thereafter, when the user pushes a "rewind" button, the microcomputer controls main motor 127 and sub motor 129 to actuate in the counterclockwise direction. When sub motor 129 is actuated in the counterclockwise direction, lever 150 moves down in the first linear direction, and accordingly as shown in FIG. 13B, contact pin 155 of lever 150 makes contact with a lower end of first cam 161 of first plate 160 so that first plate 160 is moved in the first linear direction.

When head plate 170 moves in the second linear direction by first plate 160 moving down in the first linear direction, first transmission gear 144a is separated from first reel gear 145a and second transmission gear 144b is engaged with second reel gear 145b.

Also, as lever 150 moves down in the first linear direction, first plate 160 turns about connect pin 114 in a counter clockwise direction, second plate 180 moves up in the first linear direction, and spring 199 moves up and at the same time turns in the counter clockwise direction. Then, hinge plate 190 turns in the counter clockwise direction and detection gear 196 also turns in the counter clockwise direction. At this time, detection gear 196 is separated from first reel gear 145a and is engaged with second reel gear 145b.

That is, when lever 150 moves up or down in the first linear direction, detection gear 196 is alternately engaged with first or second reel gear 145a or 145b.

As described above, the cassette tape deck according to the present invention does not require the lever 150 for switching the detection gear to be formed with a complex shape cam, so the structure is very simple.

While the present invention has been particularly shown and described with reference to a particular embodiment thereof, it will be understood by those skilled in the art that various changes and modifications can be made within the scope of the invention as hereinafter claimed.

What is claimed is:

1. A cassette tape deck, comprising:
   a chassis at which a main motor and a sub motor are installed;
   a couple of reels installed at the chassis, the reels rotating in an identical direction by the main motor which is alternately actuated in a clockwise direction or in a counterclockwise direction;
   a lever provided at a first surface of the chassis, the lever moving in a first linear direction by the sub motor which is alternately actuated in the clockwise direction or in the counterclockwise direction;
   a head plate provided at a second surface of the chassis opposite the first surface, the head plate moving in a second linear direction perpendicular to the first linear direction by the lever;
   a couple of transmission gears installed at the first surface of the chassis for transmitting a torque of the main motor to the reels, each of the transmission gears being engaged with a corresponding one of the reels by the head plate;
   a first plate turnably installed at the first surface of the chassis, the first plate being turned by the lever;
   a second plate provided between the chassis and the head plate, the second plate moving in the first linear direction by the first plate;
   a hinge plate turnably installed at the first surface of the chassis, the hinge plate being turned by the second plate; and
   a detection gear rotatably installed at the hinge plate for detecting rotations of the reels, the detection gear being alternately engaged with one of the reels by the hinge plate, wherein the hinge plate moves together with the second plate by a spring, the spring moves in the first linear direction and turns simultaneously, the spring including a head portion and a pair of legs extending from the head by crossing to each other, the head portion being connected to the hinge plate and the legs being connected to the second plate.

2. The cassette tape deck according to claim 1, wherein the chassis is formed with first and second linear guide grooves for guiding the lever, and the lever includes first and second pins inserted into the first and second linear guide grooves respectively for guiding the lever and preventing the lever from being separated from the chassis.

3. The cassette tape deck according to claim 2, wherein the first and second pins include first and second bodies penetrating the first and second vertical guide grooves respectively and first and second contact pieces extending from the first and second bodies respectively so as to make contact with the second surface of the chassis, upper ends of the first and second linear guide grooves having larger widths than diameters of the first and second contact pieces respectively such that the first and second pins are separable from the first and second linear guide grooves.

4. The cassette tape deck according to claim 2, wherein the head plate is formed at a side portion thereof with a second cam making contact with the second pin, thereby moving the head plate in the second linear direction.

5. The cassette tape deck according to claim 1, wherein the lever includes a rack receiving a torque from the sub motor so as to move the lever in the first linear direction.

6. The cassette tape deck according to claim 1, wherein the lever is formed with a contact pin, and the first plate is formed at a side portion thereof with a first cam making contact with the contact pin so as to turn the first plate.

7. The cassette tape deck according to claim 1, wherein the first plate is disposed at a portion thereof around a connect pin extending from the chassis so as to turn, and the connect pin is provided at a junction portion to the first plate thereof with a connect plate including a center portion of an arcuate shape assembled to the connect pin such that the center portion is spaced apart from the first plate and both end portions making contact with the first plate, the center portion resiliently pulling the connect pin toward the first plate, the end portions pushing the first plate toward the chassis.

8. The cassette tape deck according claim 1, wherein the second plate is formed with a projection, and the chassis is formed with a third linear guide groove receiving the projection for guiding the second plate.

9. The cassette tape deck according to claim 1, wherein the first plate is formed with a groove, and the second plate is formed with an insertion projection penetrating the chassis so as to be inserted into the groove, thereby moving together with the first plate.

10. The cassette tape deck according to claim 1, wherein the hinge plate is formed with a recess for holding the head portion of the spring, and the second plate is formed with a latch piece into which the legs are inserted.

11. The cassette tape deck according to the claim 10, wherein the recess is substantially identical to the head portion of the spring in shape and is provided with a cover for preventing the spring from separating from the recess.

12. The cassette tape deck according to claim 1, wherein the legs of the spring are crossed to each other such that a force exerted from the second plate to the spring is opposite to a force exerted from the spring to the second plate.

* * * * *